United States Patent [19]

Worley et al.

[11] 3,977,265

[45] Aug. 31, 1976

[54] POSITIVE DRIVE BELT SYSTEM

[75] Inventors: Wm. Spencer Worley; John D. Redmond, Jr., both of Denver, Colo.

[73] Assignee: The Gates Rubber Company, Denver, Colo.

[22] Filed: June 2, 1975

[21] Appl. No.: 583,069

[52] U.S. Cl. .................... 74/231 C; 74/231 R; 74/233; 74/237
[51] Int. Cl.² .................. F16G 1/28; F16G 5/16; F16G 1/22
[58] Field of Search ........... 74/231 C, 231 P, 231 R, 74/234, 233, 237

[56] References Cited
UNITED STATES PATENTS

| | | | |
|---|---|---|---|
| 2,430,500 | 11/1947 | Freedlander et al. | 74/237 X |
| 2,560,307 | 7/1951 | Slemmons | 74/231 R |
| 2,831,359 | 4/1958 | Carle | 74/233 |
| 3,730,011 | 5/1973 | Cahill et al. | 74/231 C X |
| 3,830,113 | 8/1974 | Bruns | 74/233 |

Primary Examiner—Leonard H. Gerin
Attorney, Agent, or Firm—H. W. Oberg, Jr.; Raymond Fink; Curtis H. Castleman, Jr.

[57] ABSTRACT

A toothed power transmission belt having a substantially inextensible tensile member with longitudinally spaced teeth secured thereto, the teeth having a longitudinal cross section configuration which includes low friction surfaces that extend generally perpendicularly from the tensile member to interconnected rounded corners that permit the belt teeth to mesh easily with teeth of a sprocket.

14 Claims, 6 Drawing Figures

POSITIVE DRIVE BELT SYSTEM

BACKGROUND OF THE INVENTION

The invention relates to machine elements and mechanisms, but more particularly, the invention relates to a toothed power transmission belt and a sprocket.

A conventional toothed belt, as described in U.S. Pat. Nos. 2,507,852 to Case and 2,934,967 to Warral, has teeth of essentially trapezoidal cross section which are similar to gear rack teeth. Another type flat-face tooth belt is shown in British Pat. No. 744,907.

Another conventional toothed belt is disclosed in U.S. Pat. No. 3,756,091 to Miller. The belt has teeth with generally round cross sections composed of two circular intersecting arcs. The belt teeth mesh with mating, conjugate, sprocket teeth. The size of the belt and sprocket teeth, radii of curvature, tooth angles, and belt tooth isochromatic and isoclinic fringe patterns are characterized by a set of rigorous design criteria and formulas.

The belts described in the Case, Warral and Miller patents each comprise a substantially inextensible tensile member with predominantly elastomeric teeth bonded to one side thereof. Optionally, a protective fabric covers the exterior surface of the teeth. The belt may also include a backing layer of an elastomeric material that is identical or similar to the material from which the teeth are constructed. Many different materials may be used to construct either belt. Some of the more common materials are neoprene or polyurethane.

While both the round tooth and trapezoidal tooth power transmission belts are recognized as viable means for positive drive power transmission, there is still need for improved power capacity in a toothed belt. Under high driving load conditions, the trapezoidal and round toothed belts have radial load problems as the mating belt and sprocket teeth slide into engagement with each other, creating undesirable wear and heat and introducing a radial force which tends to deflect and disengage the belt teeth from the sprocket. Compression stress must be carried through the belt teeth to the belt tensile member. Thus, the belt tension may, and the driving load vector does contribute to unnecessary compression strain of the elastomeric belt teeth.

In both prior art type belts, belt teeth are supported to a great extent on at least one side of successive sprocket teeth. Trapezoidal belt teeth lay on the sprocket teeth much like a V-belt wedges in a sheave. Round belt teeth are supported on their curvilinear driving surfaces by mating conjugate sprocket teeth. Consequently, the elastomeric teeth are subjected to radial compression stresses.

Radial compression stress of a belt tooth is in a direction along a radial line of a meshing sprocket. It has two sources: The first source is longitudinal belt tension, and the second source is the driving load transmitted between the belt and sprocket teeth during dynamic conditions. Belt tension would introduce radial compression strain to the belt teeth if there were no backlash clearance between the meshing belt and sprocket teeth. Of course, when there is clearance between the belt and sprocket teeth, belt tension radially compresses the belt in the land areas between successive belt teeth.

Under operating conditions, a sprocket transmits a driving load to meshing trapezoidal belt teeth in a direction substantially perpendicular to the planar driving surfaces of the teeth. The angle is typically 20°–25° in relation to a perpendicular to the belt. This driving load develops a radial (compression) component and a tangential (shear) component in the belt teeth. A typical driving load applied to trapezoidal belt teeth is shown in FIG. 6. As shown in FIG. 11 of Miller, such a tooth has a region of high stress and strain at its root resulting from shear and compression loading by the driving load vector.

The round toothed belt was developed to overcome stress concentration problems associated with the trapezoidal toothed belt. The Miller patent sets forth a detailed comparison of the characteristics of each belt. For the round toothed belt, a driving load is applied along the entire curvilinear surface of the teeth by conjugate teeth of a meshing sprocket. The driving load is distributed along the entire driving surfaces of the belt teeth to effect a stress distribution where the one-half order isochromatic fringe of the elastomeric belt teeth has a shape that substantially matches the conjugate sprocket teeth. This means that the resultant driving load vector applied to the belt teeth must be at a substantially large angle in relation to a perpendicular from the belt tensile members. As shown in FIG. 5, the resultant power load vector angle may be nearly 45° in relation to a perpendicular belt assuming that the belt teeth are evenly stressed across their curvilinear driving surfaces. Miller points out that the belt teeth that are in engagement with the sprocket share equally in receiving the driving load.

While a rounded toothed belt may evenly distribute stresses across its entire curvilinear driving surfaces, it nevertheless, has the same intrinsic problem as a trapezoidal toothed belt. That is, belt tension and the resultant driving load vector radially compress the belt teeth. Consequently, the belt teeth are constantly strained by a radially oriented load that does not contribute to power transmission. In other words, that effect gained by redistribution of stress within the elastomeric belt teeth may be lost as the teeth are strained by unnecessary radial load components that may especially result from use of small diameter sprockets.

A problem results as the Miller type sprockets are made smaller in diameter once a belt pitch is established (to wit, 14 millimeter). Belt pitch remains constant and is measured along its substantially inextensible tensile member. However, the arcuate interspacing between successive teeth becomes smaller as the belt is bent to smaller radii around increasingly smaller sprockets. Sprocket tooth pitch must be made correspondingly smaller. Accordingly, the sprocket tooth tip becomes so small that it becomes pointed. This is because Miller requires full support of the tooth underbody to achieve his one-half order isochromatic fringe. Since the reduction for tooth interspacing cannot come from the sprocket cavity which forms the conjugate surfaces, it must come from the sprocket tooth tip.

SUMMARY OF THE INVENTION

Belt and sprocket teeth according to the present invention are designed to overcome many of the difficulties encountered with the trapezoidal and round toothed belts. It has been determined that it is not always necessary to provide a round tooth belt to obtain improved performance over a belt having trapezoidal teeth. In accordance with the invention, a toothed belt is provided where the teeth have a profile which permits the load vector from the sprocket teeth to have a direction mainly parallel to the endless tensile member of the belt. The belt teeth are rounded at their corners to provide ease of entry and exit when meshing with teeth of a sprocket. Preferably, the belt teeth exteriors are of a material that exhibits a low coefficient of friction with the sprocket teeth.

The profile of the belt teeth minimizes radial compression stress and strain of the elastomeric belt teeth due to either belt tension or a driving load vector.

The height of the belt tooth is preferably less than that of the prior art rounded tooth belt. The lower belt tooth height enhances belt flexibility and improves performance. However, the tooth base length is similar to that specified for the round tooth belt to provide maximum tooth material for engagement with a sprocket.

The design provides a flexible belt with reduced bending stresses and a belt capable of receiving driving loads from a sprocket along a line approaching a parallel to the tensile member to reduce radial stresses in the belt teeth. Consequently, compression stress in and strain of the belt teeth are minimized. The belt design permits just two to three belt teeth to carry the load from or to a sprocket as opposed to all of the teeth carrying load as discussed in the above prior art disclosures.

The sprocket teeth are designed to load the belt teeth near their roots so that cantilevering of the belt teeth is minimized.

Although there are localized shear stress concentrations in the belt teeth, there is minimum compression stress. The primary compression stresses are received in the land area between the belt teeth. The effect of reducing compression stress in the belt teeth more than compensates for the localized shear stress concentrations developed by a driving load vector to provide a belt of less mass that is capable of providing high power transmission.

Accordingly, an object of the invention is to minimize radial compression stress of the belt teeth so that primarily only shear stresses are applied to the belt teeth.

Further details and characteristics of the invention are described in reference to the drawings wherein.

DESCRIPTION OF PREFERRED EMBODIMENTS

Figure 1:
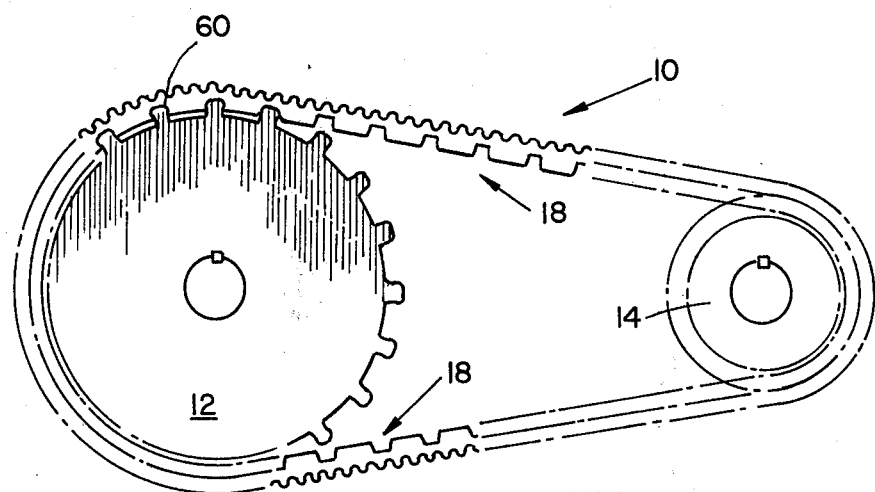
FIG. 1 is a longitudinal cross sectional view looking transversely of a preferred drive system of the invention with the belt shown in engagement with sprockets.
Figure 2:
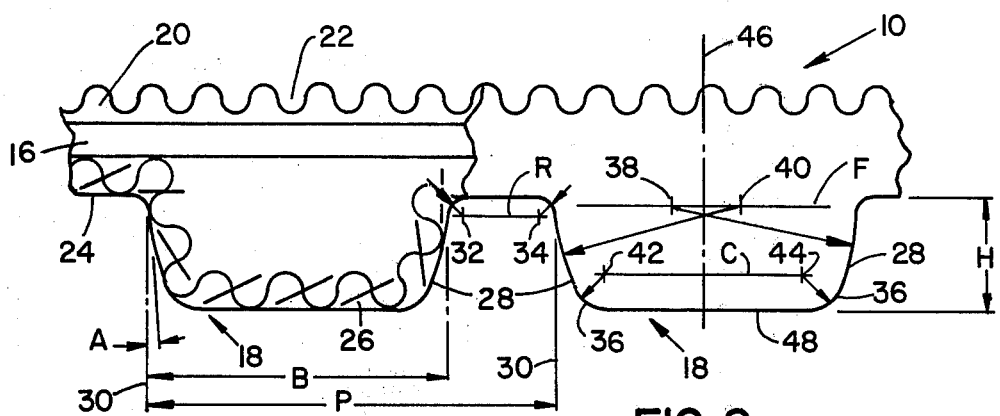
FIG. 2 is an enlarged fragmentary longitudinal view in partial cross section of the belt.

In accordance with the invention, a positive drive belt 10 is provided for meshing and operating with toothed sprockets 12, 14 to define a positive drive system. The belt is provided with a substantially inextensible tensile member 16, a plurality of longitudinally spaced belt teeth 18 and a backing layer 20. The belt may be fabricated using known manufacturing techniques. The belt teeth 18 and backing members 20 are predominantly formed of an integrally molded elastomer which may include other embedded reinforcements. Typical elastomeric materials include natural or synthetic rubbers such as neoprene or polyurethane.

While several different combinations of materials may be used, materials such as polyurethane are preferred because of their oil and abrasion resistance and their strength characteristics as measured in terms such as shear strength and tensile strength versus elongation. The physical properties of urethane permit high belt tooth loading with less strain and material failures. The tooth and backing layer elastomer may be the same or dissimilar. Preferably, when urethanes are used, the tooth elastomer and backing layer elastomer are the same. The backing layer protects the tensile members and aids in attaching the belt teeth to the tensile member. Optionally, the backing layer may have transversely aligned notches 22 that enhance belt flexibility.

The tensile member is disposed as near the belt tooth root 24 as possible to minimize the change in arcuate interspacing between successive teeth when the belt is flexed around various diameter sprockets. The tensile member is typically of the cord bundle type that extends as an endless spiral. The tensile member may be of any desired type provided that it is substantially inextensible in relation to a desired load that is to be carried. Preferable tensile member construction includes tensile members of the filament type and of a material such as fiber glass or aramid.

For the belt tooth design of the invention, the coefficient of friction between the belt tooth surface and sprocket tooth surface should be minimized. A low coefficient of friction between the two members is important to minimize belt temperatures and permit a belt tooth to fully engage a sprocket tooth upon entry. When the coefficient of friction is high, unnecessary forces are generated which prevent engagement of the belt in the sprocket. Preferably, a layer of tensile material 26 is embedded in the belt elastomer at the exterior of the teeth. An example of a textile material which satisfactorily reduces friction at the belt teeth driving surfaces to an acceptable level for proper belt operation appears in U.S. Pat. No. 3,894,900. When such a material is used, it is positioned or secured contiguous to the tensile member at the tooth root. Alternatively, the belt elastomer may be compounded to exhibit a low coefficient of friction at the belt driving surfaces 28.

As seen in the Figures, belt teeth are constructed so that driving surfaces 28 thereof extend in lineal alignment across the width of the belt. The driving surface near the root of a belt tooth extends at a very shallow angle A in relation to a perpendicular 30 from the belt tensile member. The angle A is no greater than 15°, more preferably no greater than 10° and most preferably, no greater than 5°. The generally extending perpendicular portion of the tooth defines the primary belt driving surface 28.

The primary driving surfaces may be formed by short straight lines that are quasi curvilinear, or curvilinear lines. Stress relieving radii 32, 34 are formed from the primary driving surfaces to the belt body. The driving surfaces extend in the opposite direction into rounded corners 36 that aid in meshing.

Preferably, the entire tooth profile is defined by means of a plurality of radii so there is smooth curvilinear transition from the rounded corners to the primary driving tooth surfaces. The driving face radii 38, 40 have centers falling on the line F; the stress relieving radii 32, 34 have centers falling along the line R; and the corner radii 42, 44 have centers falling along the line C. The centers of radii 38, 40 may be equally displaced from the tooth centerline 46. As the driving face radii 38, 40 are increased, the driving surfaces 28 become closer to straight lines. When the lines F and R are allowed to coincide, the root of the tooth approaches tangency to the perpendicular 30 extending from the pitch line of the belt which is defined as the center of the high modulus tensile member. The stress relieving and corner radii are chosen to form a smooth transition to the primary driving surface. Of course, it is preferred that these curve segments are substantially tangential with one another.

The corner radii 42, 44 are sufficiently large so the tooth corners 36 drop rapidly away from the driving surfaces 28. The corner radii are less than the driving surface radii. This insures that the sprocket teeth will easily enter and exit the belt teeth. The rounded corner not only permits easy entry and exit of a sprocket tooth but also precludes the corner portion of the belt tooth from receiving a driving load. As previously mentioned, the driving surface of the belt tooth has a low coefficient of friction which aids in sprocket tooth entry. It is preferred that the corners of the belt teeth have the same low friction characteristics so they may easily slide against the sprocket teeth under different power loads.

Like the prior art, the pitch spacing P of the belt teeth is chosen so that the base length dimension B of a tooth is larger than the land dimension (P minus B) between successive belt teeth. This permits a maximum amount of elastomeric material to be included in a tooth to accept driving loads from a sprocket. However, the height H of the tooth need only be generally half as deep as the base length because the corners 36 are not stressed by a driving load. The low tooth height enhances belt flexibility. There need only be a flattened surface between the two rounded corners of a tooth to define the tooth tip 48. The tooth tip 48 does not receive compression stresses from either initial belt tension or a driving load vector as will be more fully described.

As an example, dimensions of a belt built in accordance with this invention are as follows:

TABLE I

|  | Inches |
|---|---|
| Tooth Base Length | .386 |
| Stress relieving radii 32, 34 | 0.025 |
| Tooth Radii 38 and 40 | .238 |
| Distance between centers of radii 38 and 40 | .090 |
| Length of land area (P minus B) | .163 |
| Corner radii 42 and 44 | .047 |
| Tooth Height H | 0.147 |
| Tooth Pitch P | .549 |

The belt of the invention will operate with prior art sprockets such as the type disclosed by Miller. However, it is unnecessary for the sprocket teeth be formed as conjugate surfaces because a belt tooth of the invention does not need to be radially supported along its flat surface. In fact, a positive clearance is preferred between the flat surface of the belt tooth and the dedendum surface of the sprocket to allow for possible accumulation of foreign material that could foul the drive.

It is common practice to generate prior art sprocket teeth with a gear cutting hob having the appropriate profile. Usually, a gear hob is designed to cut a specific number of sprocket teeth. For example, a 28 tooth gear hob may be used to cut a 14mm pitch 28 tooth sprocket. When this is done, an exact tooth profile results. However, the same gear cutting hob may be used to cut sprockets having a few more or less teeth than that of the hob. Should a single gear cutter be used to cut an entire range of sprockets with different numbers of teeth (e.g., 12–92 teeth), the sprocket would not perfectly fit to be conjugate with a belt. This is because the sprocket tooth profile changes slightly from the designed profile as more or less teeth are cut whereas the profile of the belt tooth is unchanged. Ideally, a separate gear cutting hob should be used for each sprocket. When a hob is chosen to cut small diameter sprockets to conjugately mesh with belt teeth (e.g., 14mm pitch belt and 20 to seven tooth sprockets), the sprocket teeth become progressively pointed. When the sprocket teeth approach a sharp point, they induce high pressure points that may cause severe stress concentrations in the belt land area.

Figure 3:
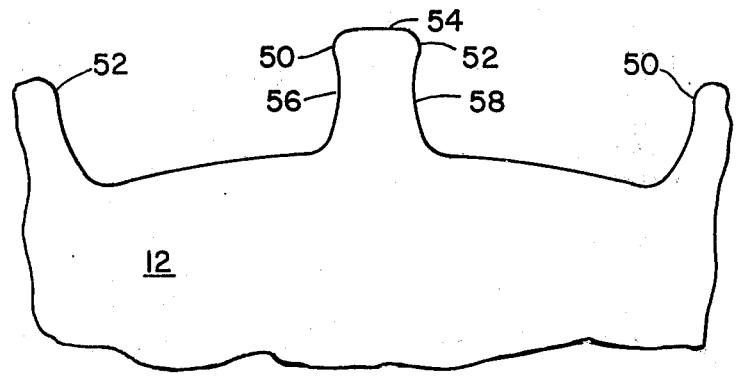
FIG. 3 is an enlarged fragementary longitudinal side view of a mating sprocket for the belt of FIG. 2.

It has been discovered that an undercut sprocket tooth may be made on smaller sprockets (e.g., sprockets from seven to 20 teeth that correspond to a belt with 14 millimeter pitch) by using a gear cutting hob designed to cut a greater number of teeth. For example, a gear cutting hob with 36 teeth may be used to generate sprockets with from seven to 20 teeth. When this is done, the sprocket tooth tip is widened which has the effect of decreasing pressure loading in the belt in the land area. Undercutting yields two salient advantages when the sprocket is used with a belt of the invention. Referring to FIG. 3, undercutting provides oppositely facing bulbous ridges 50, 52 at the sprocket tooth tip 54 which are longitudinally oriented and useful in loading the belt tooth near its root so there is a low angled driving load vector from the sprocket tooth to the belt tooth. Undercutting is present when the circumferential thickness between the bulbous ridges 50, 52 is greater than the thickness between the oppositely facing sides 56, 58 of the sprocket tooth. The second advantage is that the belt teeth are dove-tailed 60 in the undercut which helps hold the belt in the sprocket to minimize ratcheting. This is important because ratcheting usually takes place with smaller diameter sprockets.

Figure 4:
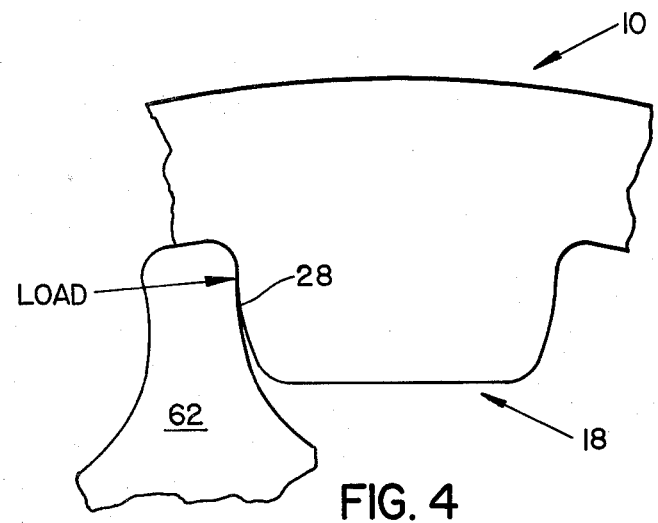
FIG. 4 is a fragmentary longitudinal side view of a belt tooth of the invention meshing with a conventional sprocket tooth and showing a driving load.

In use, the belt is trained around one or more sprockets and tensioned. The sprocket teeth impact the driving load primarily (i.e., 90+ percent) to two or three belt teeth in the sprocket. The vector to each tooth is along a line that is substantially perpendicular to the driving face of the teeth. Consequently and as shown in FIG. 4 the driving load vector from a sprocket 62 is along a line that is no greater than 15°; more preferably no greater than 10°; and most preferably no greater than 5° (e.g., zero degrees) from a tangent to the tensile member. The smaller angles insure that there is only a small force component available in the radial direction for compressively stressing the belt teeth. The low friction material helps meshing by insuring that very little radial force is transmitted parallel to the belt teeth driving surfaces.

Figure 5:
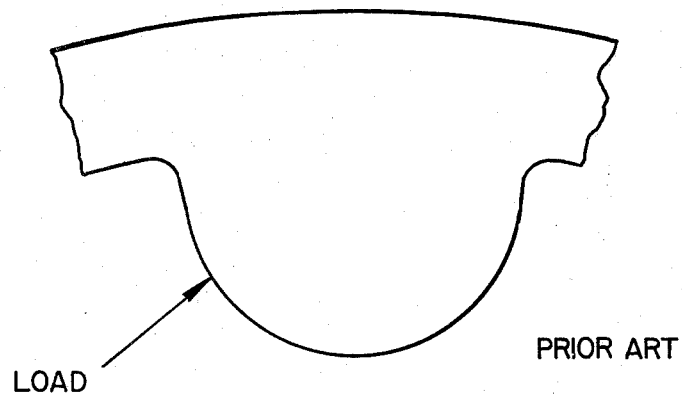
FIGS. 5 and 6 are fragmentary longitudinal side views of a conventional round and a conventional trapezoidal belt tooth respectively showing driving loads.
Figure 6:
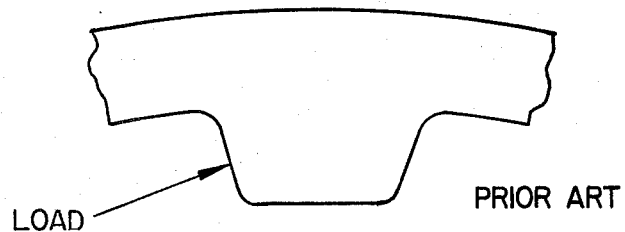

To more clearly illustrate the advantages of the invention, belts having 65 teeth with a 14 millimeter pitch were built. Two types of belts were built. The first type was constructed in accordance with this invention for comparison with the second type which was of the round tooth construction (FIG. 5) for use with conjugate sprocket teeth. Basic construction materials for the two belts were the same. Both belts were constructed using castable polyurethane as the elastomer; 60 gauge aramid cord (15,000 denier); and a nylon friction resistant facing cover. Belts were cut to comparable widths. In other words, the belts were to the same detail except for the tooth profile. Conjugate tooth type sprockets for the curvilinear belt were used for both belts. The test results are as follows:

TABLE II

Test Conditions: 19 HP; 1750 RPM; 28 tooth sprockets
(4.808 OD. in.); 5:1 tension ratio;
417 lbs. total tension; locked centers,
2 point drive.

| Belt Top Width, in. | HP/in. | Prior Art (Curvilinear Tooth) Hours/Life | This Invention Hours Life |
|---|---|---|---|
| .500 | 38 | 17 | 32 |
| .625 | 30.4 | 35 | 278 |
| .750 | 25.3 | 143 | 601 |

It should be noted that the concept of applying a driving load vector which makes large angles with a belt tensile member (e.g., 20° to 45°) results from a belt and sprocket tooth construction directed to solve entirely different problems. The present invention, however, utilizes a tooth profile in an entirely different manner to provide a belt that is capable of receiving a driving load vector that makes a small angle (e.g., 15° or less) to the tensile member. Primarily, the present invention provides a curvilinear tooth profile with rounded corners which enhance meshing with a sprocket while simultaneously changing stress distribution within a tooth.

Although the present description is limited to certain, specific embodiments, these are not intended to limit the scope of the invention which is to be determined from the appended claims.

What is claimed is:

1. A power transmission belt comprising:
an endless tensile member; and
a plurality of elastomeric teeth secured to the tensile member and having oppositely facing curvilinear surfaces generally convergingly extending from the roots of a tooth at similar angles of 15° or less from a normal to the tensile member, the curvilinear surfaces of a tooth extending into a generally flat tooth tip.

2. A belt as set forth in claim 1 comprising rounded corners interconnecting the curvilinear surfaces and the tooth tip where the radius of curvature of the rounded corners is less than the radius of curvature of the curvilinear surfaces.

3. A belt as set forth in claim 1 wherein the exterior of the curvilinear surfaces and rounded corners has a textile material embedded therein.

4. A power transmission belt comprising:
an endless tensile member; and
a plurality of substantially evenly spaced elastomeric teeth secured to the tensile member, each tooth having oppositely facing driving surfaces aligned transversely of the belt at an angle of 15° or less from a normal to the tensile member, the driving surfaces convergingly extending to spaced, outwardly facing rounded corners at a tooth tip, each tooth having a height and a base length where the height and the space between successive teeth are generally one-half or less than the base length.

5. A power transmission belt comprising:
an endless tensile member of spirally wound cord;
an elastomeric backing layer secured to one side of the tensile member;
a plurality of substantially evenly spaced elastomeric teeth secured to an opposite side of the tensile member, each tooth having oppositely facing curvilinear surfaces extending in transverse alignment in relation to the tensile member, the curvilinear surfaces convergingly arranged from the tensile member at substantially equal angles of less than 10° from a normal to the tensile member, the curvilinear surfaces extending into rounded corners that are interconnected to form a generally flattened tooth tip; and
a friction reducing fabric secured to the teeth at least at the exteriors of the curvilinear surfaces and rounded corners.

6. A positive drive power transmission belt comprising:
an endless tensile member; and
elastomeric belt teeth of substantially constant longitudinal cross section secured to the tensile member and having oppositely facing surfaces the contour of which are composed of substantially circular arcs of equal radius that have tangents which form opposite substantially equal angles of 10° or less in relation to a normal to the tensile member, the oppositely facing surfaces extending substantially tangentially to rounded interconnected corners of substantially equal radii smaller than the radii of the circular arcs.

7. A positive drive system comprising in combination the belt of claim 6 and at least one mating sprocket that radially supports the belt with sprocket teeth between meshing successive belt teeth, the sprocket teeth having dimensions and form such that they are capable of applying a power load to the meshing belt teeth along a line that is 10° or less from a tangent to the tensile member.

8. A toothed sprocket for use in a belt type positive drive system wherein the sprocket teeth have tips with longitudinally oriented oppositely facing bulbous ridges connected to and projecting past oppositely facing sides of the sprocket teeth.

9. A sprocket as set forth in claim 8 wherein the radially outward portions of the tips are formed of arcs having a major portion which substantially lie in a common circle.

10. A sprocket as set forth in claim 8 wherein the oppositely facing sides are concave surfaces formed by arcs.

11. A sprocket as set forth in claim 10 wherein the circumferential thickness of a sprocket tooth between the bulbous ridges is greater than the thickness between the oppositely facing sides.

12. A positive drive system comprising in combination the belt of claim 6 with at least one sprocket of claim 8, the belt and sprocket with dimensions such that a bulbous ridge of a sprocket tooth is adapted to apply power load at the root of the belt tooth along a line no greater than 10° from a tangent to the tensile member.

13. A power transmission belt comprising:
an endless tensile member; and
a plurality of elastomeric teeth secured to the tensile member and having oppositely facing curvilinear surfaces generally convergingly extending from the roots of a tooth at similar angles no greater than 15° from a normal to the tensile member, the curvilinear surfaces of a tooth blending into rounded corners where the radius of curvature of the rounded corners is less than the radius of curvature of the curvilinear surfaces.

14. A belt as set forth in claim 13 wherein the teeth are comprised of castable polyurethane.

* * * * *